United States Patent [19]

Rawson et al.

[11] Patent Number: 4,687,284
[45] Date of Patent: Aug. 18, 1987

[54] BRIGHT FIBER-FREE BICONICALLY TAPERED COUPLERS

[75] Inventors: Eric G. Rawson, Saratoga; Lawrence C. Stewart, Palo Alto, both of Calif.

[73] Assignee: Xerox Corporation, Stamford, Conn.

[21] Appl. No.: 646,548

[22] Filed: Sep. 4, 1984

[51] Int. Cl.⁴ .............................................. G02B 6/28
[52] U.S. Cl. .................................................. 350/96.16
[58] Field of Search ........................... 350/96.15, 96.16

[56] References Cited

U.S. PATENT DOCUMENTS

| 3,883,217 | 5/1975 | Love et al. | 350/96.16 |
| 4,330,170 | 5/1982 | Johnson et al. | 350/96.16 |
| 4,360,248 | 11/1982 | Bickel et al. | 350/96.15 |
| 4,392,712 | 7/1983 | Ozeki | 350/96.15 |
| 4,449,781 | 5/1984 | Lightstone et al. | 350/96.16 |
| 4,550,974 | 11/1985 | Murphy | 350/96.15 |

OTHER PUBLICATIONS

Rawson, E. G. and Metcalfe, R. M., "Fibernet: Multimode Optical Fibers for Local Computer Networks," *IEEE*, vol. COM-26, No. 7, pp. 983-990 (7/1978).
Rawson, E. G. and Bailey, M. D., "Bitapes Star Couples with up to 100 Fibre Channels," *Electronic Letters*, vol. 15, No. 14, (Jul. 5, 1979) pp. 432-433.
Rawson, E. G. and Nafarrate, A. B., "Star Couplers Using Fused Biconically Tapered Multimode Fibers," *Electronics Letters*, vol. 14, No. 9, (Apr. 27, 1978) pp. 274-275.

*Primary Examiner*—John Lee

[57] ABSTRACT

A biconically tapered passive star optical coupler has mutually exclusive input and output optical fibers, so that optical power injected into any one of the input fibers is relatively uniformly distributed to all of the output fibers.

3 Claims, 1 Drawing Figure

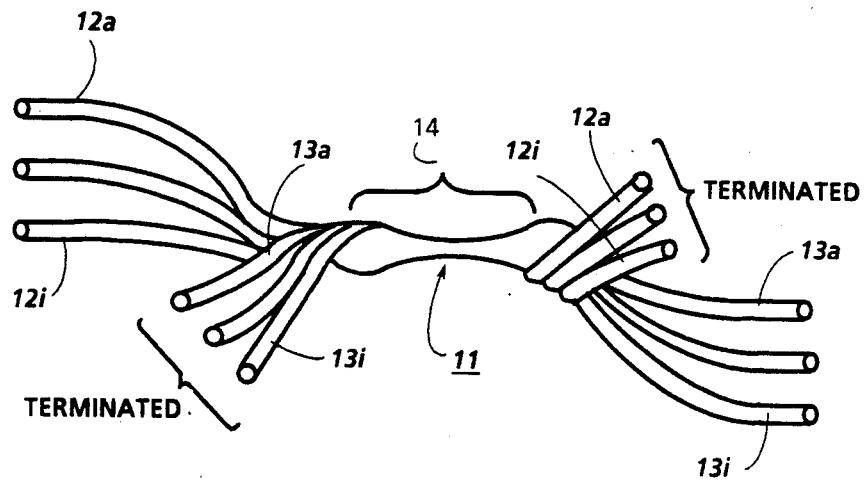

BRIGHT FIBER-FREE BICONICALLY TAPERED COUPLERS

FIELD OF THE INVENTION

This invention relates to passive star optical couplers and, more particularly, to biconically tapered star couplers having relatively limited dynamic output power ranges.

BACKGROUND OF THE INVENTION

Passive star couplers are widely utilized in fiber optic networks for distributing light (i.e., optical power) from one group of optical fiber links to another. The distribution function is a parallel process, whereby optical power injected into any one of the inputs of the coupler is distributed in parallel to all of its outputs. As a general rule, these couplers have dedicated inputs and outputs because they usually are employed in networks which superimpose a predetermined directionality upon them. However, there are passive star couplers which have generally symmetrical optical characteristics, so they may also be used to bidirectionally distribute optical power in the absence of any such external constraints.

Some passive star optical couplers, such as those shown in U.S. Pat. No. 3,883,217, have a mixing rod for distributing light from a group of input fibers to a separate, physically distinct group of output fibers. These couplers typically have relatively uniform optical power distribution characteristics, whereby light injected into any of the input fibers of such a coupler is more or less equally divided among all of its output fibers. However, such couplers often cause significant attenuation of the injected light because of their insertion losses and their so-called "packing fraction" losses. See, Rawson E. G. and Metcalfe, R. M., "Fibernet: Multimode Optical Fibers for Local Computer Networks," *IEEE Transactions on Communications*, Vol. COM-26, No. 7, pp. 983-990. As Rawson and Metcalfe point out, supra at p. 986, steps can be taken to improve the efficiency of mixing rod couplers, but the cost of doing so often outweighs the increased efficiencies that can be achieved.

Accordingly, biconically tapered star couplers, such as described in Rawson, E. G. and Bailey, M. D., "Bitaper Star Coupler with up to 100 Fibre Channels," *Electronic Letters*, Vol. 15, No. 14, July 5, 1979, pp. 432-433, have become the passive star couplers of choice for most applications requiring relatively efficient (i.e., low loss) distribution of the available optical power. A preferred technique for fabricating such a coupler is to locally heat intermediate segments of a plurality of tensioned and coaxially twisted optical fibers, so that the claddings of the heated fiber segments soften sufficiently to thermally fuse and optically unit while the fibers are being drawn to form an axially extending, biconical taper. See, E. G. Rawson and A. B. Nafarrate, *Electronics Letters*, Vol. 14, No. 9, Apr. 27, 1978, pp. 274-275. As is known, light injected into any one of the fibers of such a coupler is gradually transformed into all of the outer fibers as the light passes through the biconically tapered segment. Characteristically, of course, the input and output ports of such a coupler are the opposite ends of the same fibers, rather than being defined by physically distinct fibers.

Known biconically tapered star couplers suffer from the disadvantage of having one output receive a disproportionately large share of the available optical power. Specifically, light injected into any one of the inputs of such a coupler is relatively uniformly distributed to all of its outputs, with the single exception of the one which is defined by the excited or illuminated fiber. Analysis indicates that only about 90%-95% of the injected power is extracted from the excited fiber, which suggests that the excited fiber has an elevated output power level because it not only receives its pro rata share of the extracted power, but also as much as an additional 5%-10% of the injected power. That conclusion is supported by a finding that the ratio of the output power of the excited or so-called "bright fiber" to the average output level of the other, non-excited fibers increases as a function of the number of fibers, N, contained by the coupler. Existing biconically tapered couplers have dynamic output power ranges of about 2:1 to about 10:1, but even wider dynamic output power ranges can be anticipated if conventional biconically tapered coupler technology is applied to satisfy the demand for couplers having increased channel capacities.

It has been found that the imperfect power extraction mechanism is the most significant cause of the non-uniform optical power distribution characteristics of both large and small biconically tapered couplers. Although the normalized standard deviation of the output power levels of the non-excited fibers of such a coupler relative to average output power level of such fibers also increases as a function of N, it characteristically ranges from approximately 7%-17% for relatively large couplers containing one hundred fibers or so, and is even less for smaller couplers.

Heretofore, system designers have made allowances for the wide dynamic output power ranges of biconically tapered couplers. It has been recognized that the bright fiber of such a coupler cannot be identified in advance, so the accepted practice is to design the system components (e.g., receivers) which are to be driven by the outputs of such a coupler to accomodate the "worst case" dynamic output power range of the coupler, even though that necessarily increases the cost and complexity of those components. Moreover, there has been substantial reluctance to employ such couplers for applications in which significant output power variations cannot be tolerated.

Others have attempted to reduce the dynamic output power range of biconically tapered couplers. For example, it has been suggested that the biconical taper of such a coupler can be temporally severed at its waist, so that the severed segments of the taper can be re-fused after they have been rotated relative to one another as required to more uniformly distribute injected power to all of the outputs of the coupler. These additional manufacturing steps necessarily increase the cost and complexity of the coupler fabrication process, and do not fully compensate for the imperfect power extraction mechanism of the central fibers of such couplers. Similarly, it has been suggested that a mixing rod can be fused between the severed segments of the biconical taper of such a coupler, so that the mixing rod relatively uniformly distributes the injected power to all of the coupler outputs. This approach essentially eliminates the "bright fiber," but it increases the cost and complexity of both the coupler and the coupler fabrication process. Moreover, both of the above described proposals increase the coupler insertion loss by introducing fusion losses.

SUMMARY OF THE INVENTION

In accordance with the present invention, the inputs and outputs of a biconically tapered passive star coupler are defined by mutually exclusive sets of optical fibers, thereby substantially reducing the dynamic output power range of the coupler. Such a coupler typically requires twice as many fibers as a standard biconically tapered coupler of equivalent channel capacity, but that results in an increased insertion loss of only −3 dB to −4 dB or so, which is tolerable for most applications.

BRIEF DESCRIPTION OF THE DRAWINGS

Still other features and advantages of this invention will become apparent when the following detailed description is read in conjunction with the attached drawing, which illustrates a biconically tapered passive star coupler constructed in accordance with the present invention.

DETAILED DESCRIPTION OF THE ILLUSTRATED EMBODIMENT

While the invention is described in some detail hereinbelow with specific reference to a single illustrated embodiment, it is to be understood that there is no intent to limit it to that embodiment. On the contrary, the aim is to cover all modifications, alternatives and equivalents falling within the spirit and scope of the invention as defined by the appended claims.

Turning now to the drawing, there is a biconically tapered passive star coupler 11 having a plurality of optical fibers 12a–12i and 13a–13i. In keeping with accepted practices, the fibers 12a–12i and 13a–13i are coaxially twisted and optically united (such as by thermally fusing their claddings) within an axially extending, biconically tapered region 14. The biconical taper 14 is located between the opposite ends of the fibers 12a–12i and 13a–13i, whereby light injected into any one of the input fibers 12a–12i is gradually transformed into all of the output fibers 13a–13i as the light passes through te biconical taper 14.

In accordance with the present invention, the coupler 11 has no "bright" fiber. To that end, the input fibers 12a–12i and the output fibers 13a–13i are mutually exclusive sets of optical fibers. No single fiber functions both as an input and as an output of the coupler 11, so that the imperfect power extraction mechanism of the coupler 11 has no affect on the uniformity of the output power levels of the fibers 13a–13i. Indeed, as shown, the input fibers 12a–12i and the output fibers 13a–13i may be terminated immediately adjacent the output and the input sides, respectively, of the biconically taper 14. Under some circumstances, it may be desireable to provide anti-reflective terminations (not shown) for the unused ends of the input and output fibers 12a–12i and 13a–13i, thereby reducing or eliminating unwanted reflections therefrom.

Eliminating the bright fiber leads to a very significant improvement in the uniformity of the power levels of the output fibers 13a–13i. Typically, the dynamic output power range of the bright fiber-free coupler 11 is only 1.2:1 or so, which is nearly an order of magnitude less than the dynamic output power range of relatively small, conventional biconically tapered couplers and an even more striking improvement when compared against larger couplers. The dynamic output power range of the coupler 11 tends to increase as a direct function of its channel capacity, but the rate of increase is much slower than the rate at which the dynamic output power range of a conventional biconically tapered coupler increases as a function of channel capacity.

Although the elimination of the bright fiber increases the insertion loss of the coupler 11, the additional loss is so slight that it is tolerable under most circumstances. For example, if the coupler 11 has n input fibers 12a–12i and n output fibers 13a–13i for a total fiber count of 2 n, it provides the same channel capacity as a conventional n-channel biconically tapered coupler while causing an additional insertion loss of only about −3 dB to −4 dB. As a general rule, such a minor increase in insertion loss is an acceptable tradeoff from a system design point of view because the relatively uniform optical distribution characteristics of the coupler 11 significantly relaxes the dynamic input power range requirements for the system components which are to be driven by the coupler 11, thereby reducing the cost and complexity of those components.

CONCLUSION

In view of the foregoing, it will be understood that the present invention provides biconically tapered passive star optical couplers which have narrowly limited dynamic output power ranges. As will be appreciated, these couplers are particularly attractive for applications in which a small increase in insertion loss can be tolerated in the interest of materially reducing the dynamic output power range of the coupler.

What is claimed is:

1. A biconically tapered passive star optical coupler comprising first and second mutually exclusive sets of optical fibers configured to form an axially extending biconical taper; the fibers of said first and second sets being coaxially twisted about one another, being optically united throughout said biconical taper, and being terminated internally of said coupler adjacent opposite sides of said taper; whereby light injected into any of the fibers of one of said sets is gradually transformed into and generally uniformly distributed among all of the fibers of the other of said sets.

2. The coupler of claim 1 wherein said first and second sets contain equal numbers of optical fibers.

3. The coupler of claim 1 wherein said optical fibers have claddings which are thermally fused within said biconical taper to optically unite said fibers.

* * * * *